(12) United States Patent
Rollins et al.

(10) Patent No.: US 10,578,236 B2
(45) Date of Patent: Mar. 3, 2020

(54) HOSE AND SYSTEM FOR HOSE CLAMP REGISTRATION

(71) Applicant: Ford Global Technologies, LLC, Dearborn, MI (US)

(72) Inventors: Scott M. Rollins, Canton, MI (US); Roger Khami, Troy, MI (US); Randall Alan Stec, Canton, MI (US); Dennis Davies, White Lake, MI (US); Christopher Alan Myers, Holly, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 15/599,304

(22) Filed: May 18, 2017

(65) Prior Publication Data
US 2017/0254458 A1     Sep. 7, 2017

Related U.S. Application Data

(62) Division of application No. 13/898,208, filed on May 20, 2013, now Pat. No. 9,683,691.

(51) Int. Cl.
| | |
|---|---|
| *F16L 33/06* | (2006.01) |
| *F16L 21/00* | (2006.01) |
| *F16L 25/12* | (2006.01) |
| *F16L 27/107* | (2006.01) |
| *F16L 33/08* | (2006.01) |
| *F02M 35/10* | (2006.01) |
| *F02M 25/06* | (2016.01) |

(52) U.S. Cl.
CPC ....... *F16L 33/06* (2013.01); *F02M 35/10144* (2013.01); *F16L 21/005* (2013.01); *F16L 25/12* (2013.01); *F16L 27/107* (2013.01); *F16L 33/08* (2013.01); *F02M 25/06* (2013.01)

(58) Field of Classification Search
CPC ......... F16L 33/06; F16L 33/08; F16L 27/107; F16L 21/005; F16L 25/12; F16L 59/168; F02M 25/06; F02M 35/10144; Y10T 24/1441; Y10T 24/1443
USPC ......................................... 285/235, 236, 237
See application file for complete search history.

(56) References Cited

U.S. PATENT DOCUMENTS

| | | | |
|---|---|---|---|
| 958,706 | A | 5/1910 | Chambless |
| 3,424,482 | A | 1/1969 | Ligon |
| 4,286,361 | A | 9/1981 | MacKenzie |
| 4,372,120 | A | 2/1983 | Ford, Jr. et al. |
| 4,491,350 | A | 1/1985 | Wolf et al. |
| 4,856,826 | A | 8/1989 | Engel et al. |
| 4,899,726 | A | 2/1990 | Waterman |
| 5,027,665 | A | 7/1991 | Hayward |
| 5,163,718 | A | 11/1992 | Cannon |
| 5,501,472 | A | 3/1996 | Brancher et al. |

(Continued)

OTHER PUBLICATIONS

Anonymous, "Mobile Refueling and Its Information Infrastructure," IPCOM No. 000241101, Mar. 26, 2015, 2 pages.

*Primary Examiner* — James M Hewitt, II
(74) *Attorney, Agent, or Firm* — Geoffrey Brumbaugh; McCoy Russell LLP

(57) ABSTRACT

A hose and a system including a hose may be used to connect various components. The hose may include a hose body, where an end segment of the hose body may be foldable over a clamp seat area of the hose body. There may be an opening in the end segment sized and shaped to provide access to a clamp, so as to better hold the clamp in place, while still enabling access.

14 Claims, 6 Drawing Sheets

(56) References Cited

U.S. PATENT DOCUMENTS

| | | |
|---|---|---|
| 5,630,255 A | 5/1997 | Eliasson |
| 5,655,795 A | 8/1997 | Strnad et al. |
| 5,915,739 A | 6/1999 | Cradduck et al. |
| 6,312,025 B1 | 11/2001 | Wolfsdorf |
| 6,343,772 B1 | 2/2002 | Oi |
| 6,394,505 B1 | 5/2002 | Schmucki et al. |
| 6,701,581 B2 | 3/2004 | Senovich et al. |
| 8,181,314 B2 | 5/2012 | Mohlin et al. |
| 2005/0205067 A1 | 9/2005 | Koide et al. |

HOSE AND SYSTEM FOR HOSE CLAMP REGISTRATION

CROSS REFERENCE TO RELATED APPLICATION

The present application is a divisional of U.S. patent application Ser. No. 13/898,208, entitled "HOSE AND SYSTEM FOR HOSE CLAMP REGISTRATION," filed on May 20, 2013, and issued as U.S. Pat. No. 9,683,691 on Jun. 20, 2017. The entire contents of the above-referenced application are hereby incorporated by reference in their entirety for all purposes.

FIELD

The present application relates to a hose and a system wherein a portion of the hose may include one or more integral features such a foldable portion that may be shaped to hold a hose clamp in place and structured to provide access to a clamp adjustment mechanism.

BACKGROUND AND SUMMARY

In high volume engine assembly it may be desirable to have ducts and hoses arrive for final attachment with hose clamps pre-positioned in the desired location and orientation on the hoses. In this way, production time may be used most effectively when workers are ready to tighten the clamps in place. However, the clamps may get bumped, and/or may catch on other edges or parts, during shipping, or production. This may result in the clamps moving or pulling off of the hoses creating production delays, and/or other undesirable consequences.

Attempts have been made to provide hose clamps that are more apt to stay in place. For example U.S. Pat. No. 5,915,739 provides a clamp retention device for positioning and retaining a hose clamp on a hose to ready the clamp to be closed onto mating components. The device has a retainer and a locator spaced axially from the retainer in a side-by-side relationship. The locator is adapted to hold the clamp while the retainer is adapted to engage the hose to maintain the device in position on the hose.

The inventors herein have identified a number of issues with this approach. For example, when in place on the hose, for example, during shipping, or handling, the disclosed device may snag, or catch on other parts. In additional, while the disclosed locator may tend to hold the device in place, if sufficiently bumped and mis-oriented, the locator may tend to make the clamp difficult to reorient properly.

Embodiments in accordance with the present disclosure may provide a hose having a hose body. An end segment of the hose body may be foldable over a clamp seat area of the hose body. There may be an opening in the end segment sized and shaped to provide access to the clamp seat area. A clamp may be disposed over the clamp seat area, and the clamp may have a clamp adjustment mechanism used to adjust a tightness of the clamp accessible via the opening.

In this way, the clamp may be at least partially protected by at least part of the end segment and may thus be less prone to being contacted by other nearby or adjacent objects such as other hoses, or clamps, or other objects that may be present in a storage or assembly environment, or the like. For example, the passages may be more likely to arrive at their respective factory assembly stations with the hose clamps disposed over the hose in the proper location and/or orientation.

Certain embodiments may provide a hose having a hose body, and one or more clamp retention features integrally formed into the hose body to retain a clamp from movement relative to the hose body beyond a predetermined amount of movement. In this way, the hose may be efficiently shaped to receive a clamp and to the hold the clamp in a proper location and/or orientation for ready and rapid use in a factory environment, and the like.

Some embodiments may provide a system that may include a flexible engine passage and a clamp arrangement. The system may also include a passage body and a clamp positioned over a portion of the passage body. The clamp may have a clamp adjustment mechanism to adjust a tightness of the clamp. An end segment of the passage body may be foldable over the clamp. The end segment may have an opening providing access to the clamp adjustment mechanism when the end segment is in a folded state. In this way certain operation in, for example, a factory environment may be made more effective.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 are drawn approximately to scale, although other relative dimensions may be used if desired. Further, the figures show various components and relative sizes to one another, one or more of which may be advantageous in enabling the hose clamp arrangement described herein to function effectively.

DETAILED DESCRIPTION

Figure 1:
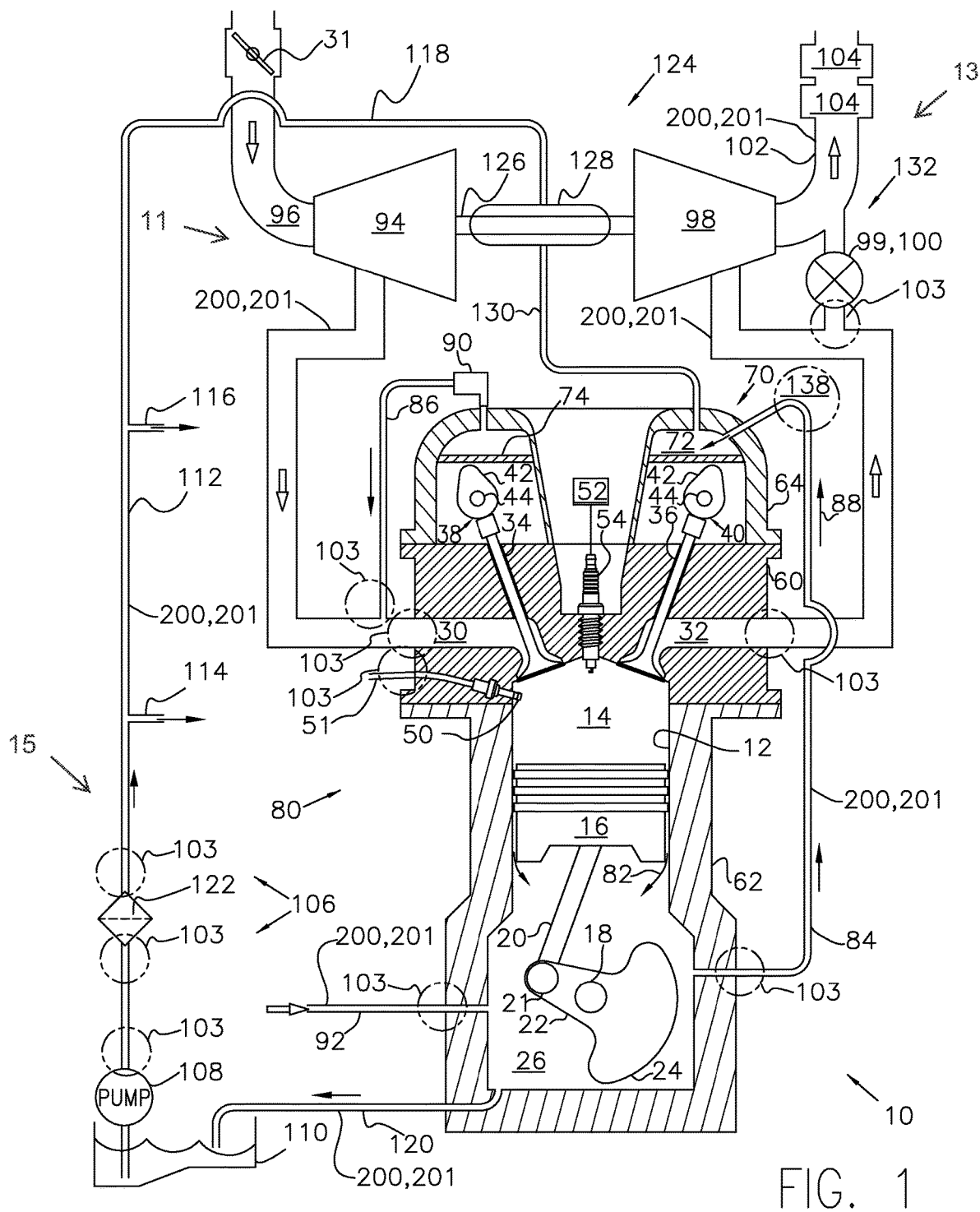
FIG. 1 is a schematic diagram of an example engine in accordance with the present disclosure.

FIG. 1 is a cross-sectional diagram illustrating a cross-section of an engine 10 in accordance with the present disclosure. Various features of the engine may be omitted, or illustrated in a simplified fashion for ease of understanding of the current description. For example, areas may include continuous cross hatching that may otherwise indicate a solid body, however actual embodiments may include various engine components, and/or hollow, or empty, portions of the engine with the cross hatched areas.

The engine 10 may include various engine systems including, but not limited to, an intake system 11, and exhaust system 13, a fuel system 15, and an engine crankcase ventilation system 80 such as a PCV system. The engine systems, discussed in more detail below, may include a number of passages 201, such as hoses 200, or tubes, and the like, to direct various fluids from one engine component to another. The passages 201 may be flexible engine passages 201, such as flexible hoses, including rubber hoses, plastic hoses, metallic flex hoses, etc. A passage 201 may be coupled with a mating component with a hose clamp that may be configured to compress a female end of the hose in sealing engagement with a male end of the mating component. The flexibility of the passage may be relative to other components, such as more rigid components including the intake manifold, throttle body, air box, etc. Further, the flexibility of the component may be such that the passage or hose if able to flex when manipulated by hand so that the passage or hose may be installed and/or removed from the engine compartment, or other location.

The cross-sectional view shown in FIG. 1 may be considered taken through one cylinder 12 of the engine 10. Various components of the engine 10 may be controlled at least partially by a control system that may include a controller (not shown), and/or by input from a vehicle operator via an input device such as an accelerator pedal (not shown). The cylinder 12 may include a combustion chamber 14. A piston 16 may be positioned within the cylinder 12 for reciprocating movement therein. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel of a vehicle via an intermediate transmission system. Further, a starter motor may be coupled to crankshaft 18 via a flywheel to enable a starting operation of engine 10.

Combustion chamber 14 may receive intake air from an intake passage 30, and may exhaust combustion gases via exhaust passage 32, which may respectively be referred to as an intake system 11 and an exhaust system 13. Intake passage 30 and exhaust passage 32 may selectively communicate with combustion chamber 14 via respective intake valve 34 and exhaust valve 36. A throttle 31 may be included to control an amount of air that may pass through the intake passage 30. In some embodiments, combustion chamber 14 may include two or more intake valves and/or two or more exhaust valves.

The intake passage 30 and/or the exhaust passage 32 may be hoses 200, or passages 201 which may be coupled to mating engine components with respective clamps at coupling locations 103, or other locations, in accordance with the present disclosure. Although it may not be specifically identified, or discussed in all possible cases in the examples discussed, it should be understood that a hose, a passage, and/or a clamp configured in accordance with the present disclosure may be utilized as such in various other parts of various engines.

In this example, intake valve 34 and exhaust valve 36 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 34 and exhaust valve 36 may be determined by position sensors (not shown). In alternative embodiments, intake valve 34 and/or exhaust valve 36 may be controlled by electric valve actuation. For example, cylinder 16 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller. In this manner, fuel injector 50 may provide what is known as direct injection of fuel into combustion chamber 14. The fuel injector 50 may be mounted in the side of the combustion chamber 14 or in the top of the combustion chamber 14, for example. Fuel may be delivered via fuel line 51 to fuel injector 50 by a fuel system 15 that may include a fuel tank, a fuel pump, and a fuel rail (not shown). In some embodiments, combustion chamber 14 may alternatively or additionally include a fuel injector arranged in intake passage 30 in a configuration that provides what is known as port injection of fuel into the intake port upstream of combustion chamber 14. The fuel line 51 may be a hose 200, or passage 201 which may be coupled to a mating engine component, such as cylinder head 60, with a clamp (not shown) at coupling locations 103, or other locations, in accordance with the present disclosure.

Ignition system 52 may provide an ignition spark to combustion chamber 14 via spark plug 54 in response to a spark advance signal from the controller, under select operating modes. Though spark ignition components are shown, in some embodiments the combustion chamber 14 or one or more other combustion chambers of engine 10 may be operated in a compression ignition mode, with or without an ignition spark.

Cylinder head 60 may be coupled to a cylinder block 62. The cylinder head 60 may be configured to operatively house, and/or support, the intake valve(s) 34, the exhaust valve(s) 36, the associated valve actuation systems 38 and 40, and the like. Cylinder head 60 may also support the camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block 62, or engine block, may be configured to house the piston 16. In one example, cylinder head 60 may correspond to a cylinder 12 located at a first end of the engine. While FIG. 1 shows only one cylinder 12 of a multi-cylinder engine 10, each cylinder 12 may similarly include its own set of intake/exhaust valves, fuel injector, spark plug, etc.

FIG. 1 also illustrates an oil separator 70 which may include an oil separation chamber 72 and bottom plate 74, which may define a bottom of the oil separation chamber 72. The oil separator 70 may be included in the cam cover 64 as illustrated, or may be located in another location within, or associated with, the engine 10. The bottom plate 74, and/or the oil separation chamber 72 may be mounted on, or in and/or supported by cylinder head 64. The oil separator 70 may extend lengthwise along a portion of the length of the engine bank, that is, in a direction substantially parallel with the axes of the camshafts 44. Oil separator 70 may be considered to include the cam cover 64. One or more baffles (not shown) may be included with the oil separator 70.

Oil separator 70 may be included as part of an engine crankcase ventilation system 80. The engine crankcase ventilation system 80 may be a positive crankcase ventilation system, or (PCV) system 80. The engine crankcase ventilation system 80 may be included with the engine 10 to mitigate an amount of undesirable exhaust gases that may be emitted from the engine 10. During operation some blow-by gasses 82, as illustrated in FIG. 1 with arrows may pass from the combustion chamber 14 to the crankcase 26. Some of the blow-by gasses 82 may be incompletely combusted, and may be reintroduced into the combustion chamber 14 via a first crankcase ventilation line 84, a second crankcase ventilation line 86, and the intake passage 30 in an attempt to combust them more completely. However, the blow-by gasses 82 may include suspended oil picked up in the stream of gasses from one or more locations within the engine such as the crankcase 26. In an attempt to separate the suspended oil from the blow-by gasses 82 the mixture of oil and blow-by gasses 88, as illustrated with an arrow may be first passed through the oil separator 70. The first crankcase ventilation line 84 and/or the second crankcase ventilation line 86 may be hoses 200, or passages 201 which may be coupled to respective mating engine components with a clamp at coupling locations 103, or other locations, in accordance with the present disclosure.

A flow level of the crankcase ventilation gases through the engine crankcase ventilation system 80 may be controlled by one or more mechanism which may include a valve 90. In some cases the valve 90 may be referred to as a Positive Crankcase Ventilation (PCV) valve. In some cases a breather tube 92 or breather passage, or the like, may be included to add clean air into the crankcase 26 in order to purge, or reduce the concentration of undesirable crankcase gases. In some cases the breather tube 92 may be fluidically coupled with the intake manifold, and/or intake passage 30 as a source of clean air.

A turbo compressor 94 may be disposed on an induction air path 96 for compressing an induction fluid before the induction fluid is passed to the intake passage 30 of the engine 10. In some applications, an inter-cooler (not shown) may be included to cool the intake charge before it enters the engine. The turbo compressor 94 may be driven by an exhaust turbine 98 which may be driven by exhaust gasses leaving the exhaust manifold 32. In some cases, the throttle 31 may be downstream from the turbo compressor 94 instead of upstream as illustrated. Although not illustrated, the engine 10 may include an exhaust gas recirculation EGR line and/or EGR system.

The flow of exhaust gasses may be regulated, or controlled by one or more exhaust gas flow directing mechanisms 99. For example the engine 10 may include a wastegate 100 configured to divert exhaust gases away from the exhaust turbine 98 and to an exhaust line 102. Diverting the exhaust gases may help regulate the speed of the exhaust turbine 98 which in turn may regulate the rotating speed of the turbo compressor 94. The wastegate 100 may be configured as a valve. The wastegate 100 may be used to regulate, for example, a maximum boost pressure in the turbocharger system, which may help protect the engine and the turbocharger.

The exhaust line 102 may include one or more emission control devices 104, which may be mounted in a close-coupled position in the exhaust line 102. The one or more emission control devices 104 may include, for example, a three-way catalyst, lean NOx trap, diesel particulate filter, oxidation catalyst, etc.

The engine 10 may include an engine lubrication system 106, for example an oil lubrication system, which may include an oil pump 108, or other actuation means, to pump, and/or to pressurize, oil to move through the lubrication system 106. The oil pump 108 may be configured to suck oil from an oil reservoir, stored in oil pan 110, through a supply channel 112. The lubrication system 106 may include various branches 114, 116, 118 to provide oil to various oil subsystems. Oil may be returned through one or more return paths which may include a return channel 120 wherein the oil may run or drip back to the oil pan 110. Oil may be filtered with oil filter 122. The oil subsystems may utilize oil flow to perform some function, such as lubrication, actuation of an actuator, etc. Example, subsystems may include lubrication systems, such as passageways for delivering oil to moving components, such as the camshafts, cylinder valves, etc. Other oil subsystems may include hydraulic systems with hydraulic actuators and hydraulic control valves. There may be fewer or more oil subsystems than as shown in the illustrated example. The oil supply channel 112 and/or the various branches 114, 116, 118 may be hoses 200, or passages 201 which may be coupled to mating engine components with a clamp at coupling locations 103, or other locations, in accordance with the present disclosure.

One oil subsystem may be a turbine bearing lubrication system 124 which may receive oil via a turbine oil supply branch 118. The turbo compressor 94 may be coupled for rotation with the exhaust turbine 98 via a turbine shaft 126. The turbine shaft 126 may be supported for rotation by turbine bearings 128, and may be lubricated with the turbine bearing lubrication system 124. The oil may be returned to other parts of the engine 10 for recirculation, filtration, etc. via oil return line 130.

Figure 2:
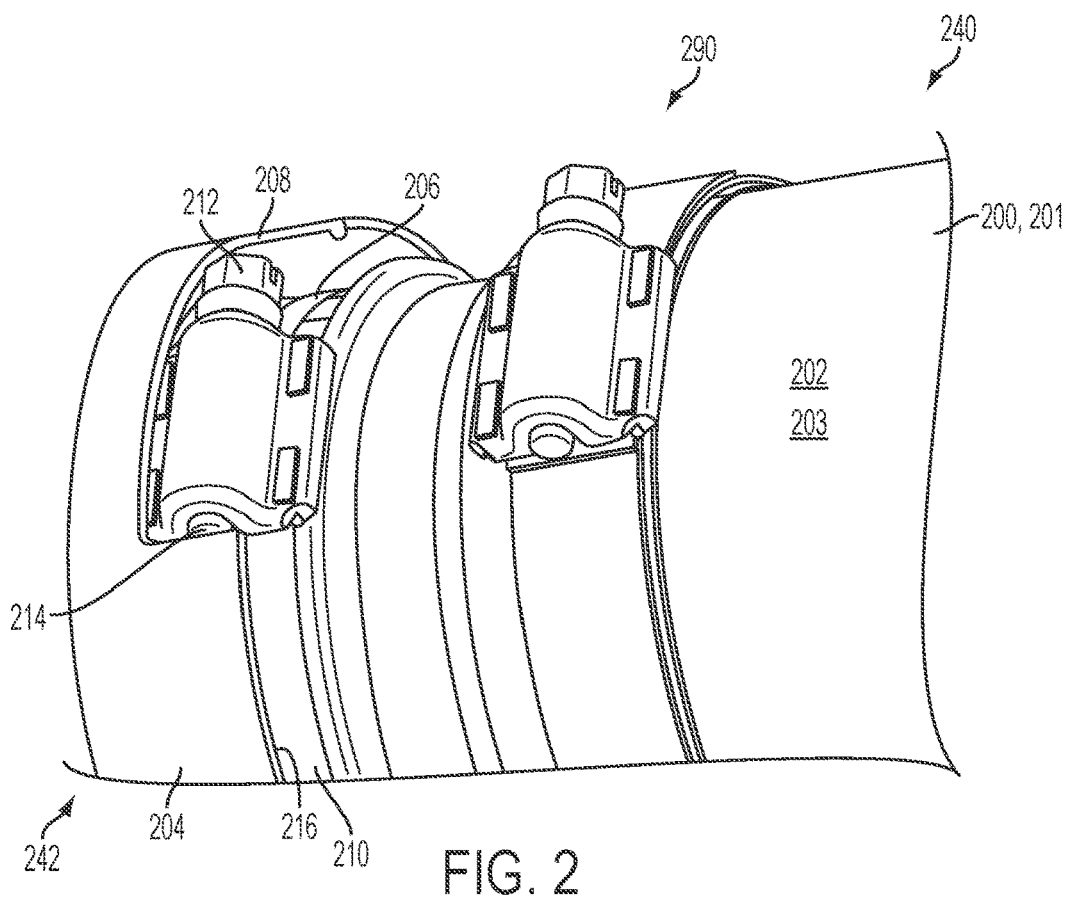
FIG. 2 is a perspective view of an end of a hose in accordance with the present disclosure.
Figure 3:
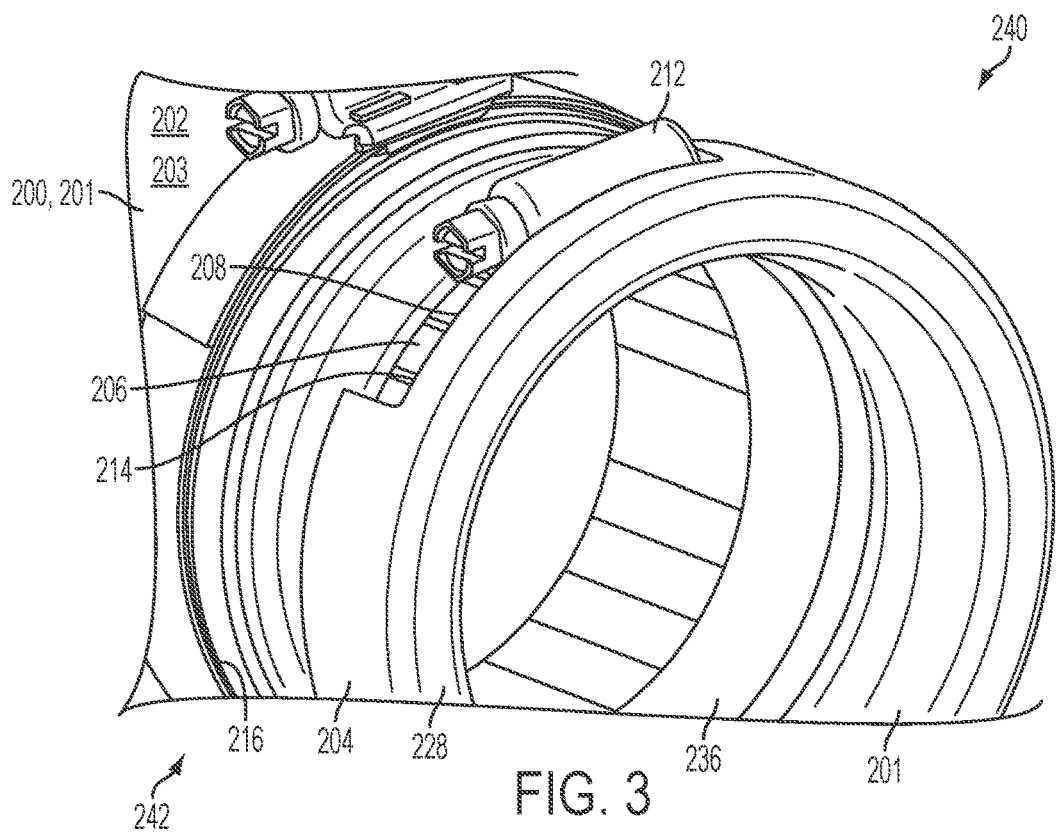
FIG. 3 is a perspective end view the hose illustrated in FIG. 2.

FIG. 2 and FIG. 3 are respective side and end perspective views of an example hose 200, or passage 201, in accordance with the present disclosure. The hose 200 may include a hose body 202. An end segment 204 of the hose body 202 may be foldable over a clamp seat area 206 of the hose body 202. An opening 208 in the end segment 204 may be sized and shaped to provide access to the clamp seat area 206. The clamp seat area 206 may be disposed to receive a clamp 210 in overlying disposition with the clamp seat area 206. The clamp 210 may have a clamp adjustment mechanism 212 useable to adjust a tightness of the clamp 210. The clamp 210 may be accessible via the opening 208. The angle of the opening 208 may be for example between 50 and 75 degrees and may be for example approximately 67 degrees.

Figure 4:
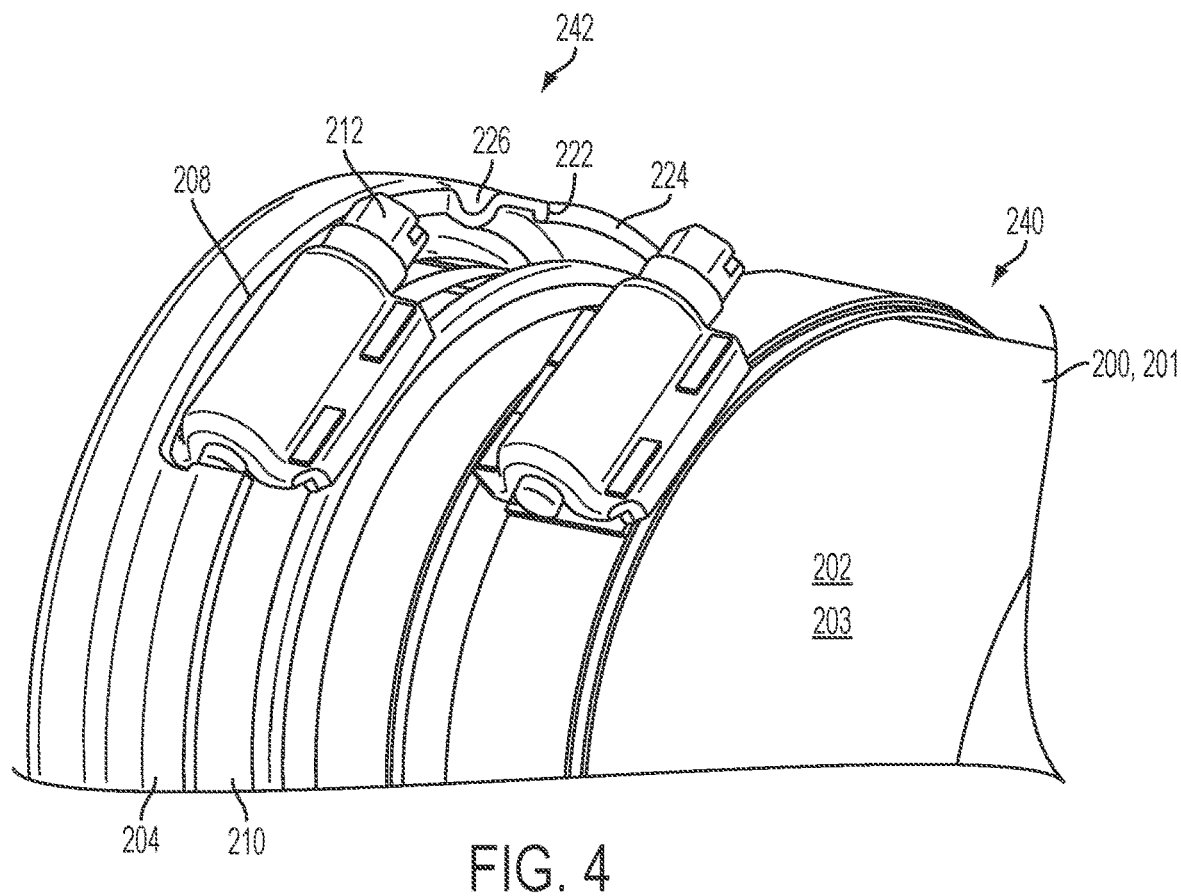
FIG. 4 is a perspective view of another example hose, or passage, in accordance with the present disclosure.
Figure 5:
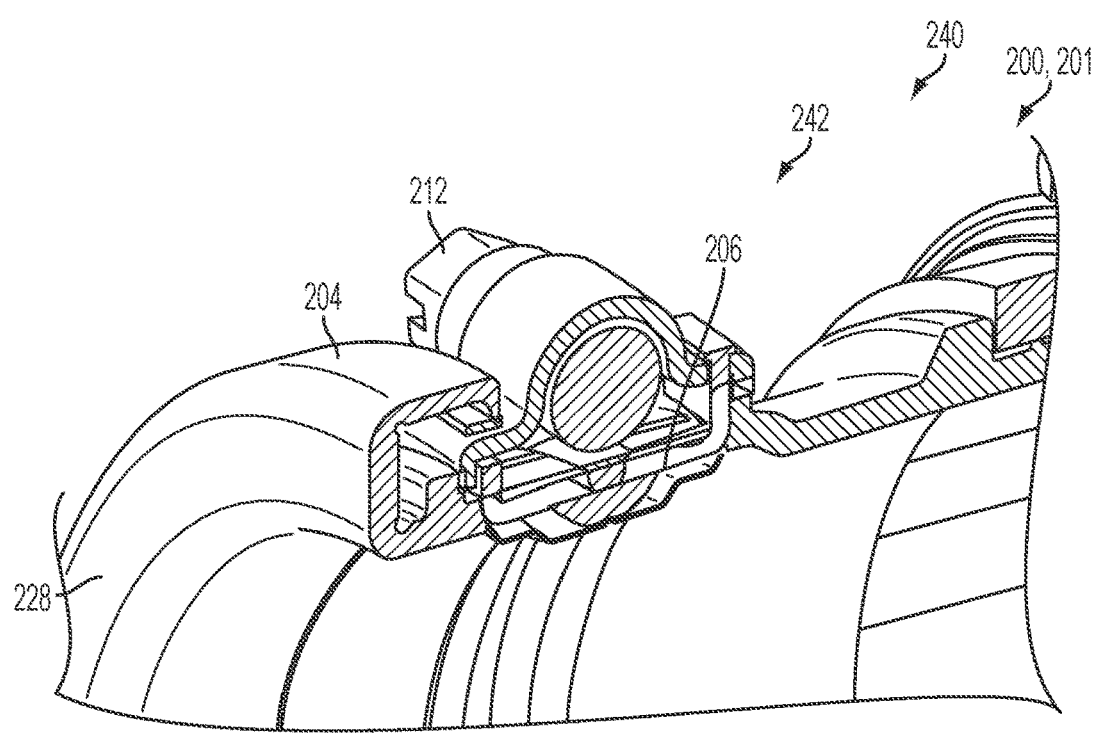
FIG. 5 is a perspective cross-sectional view of the hose illustrated in FIG. 4.
Figure 6:
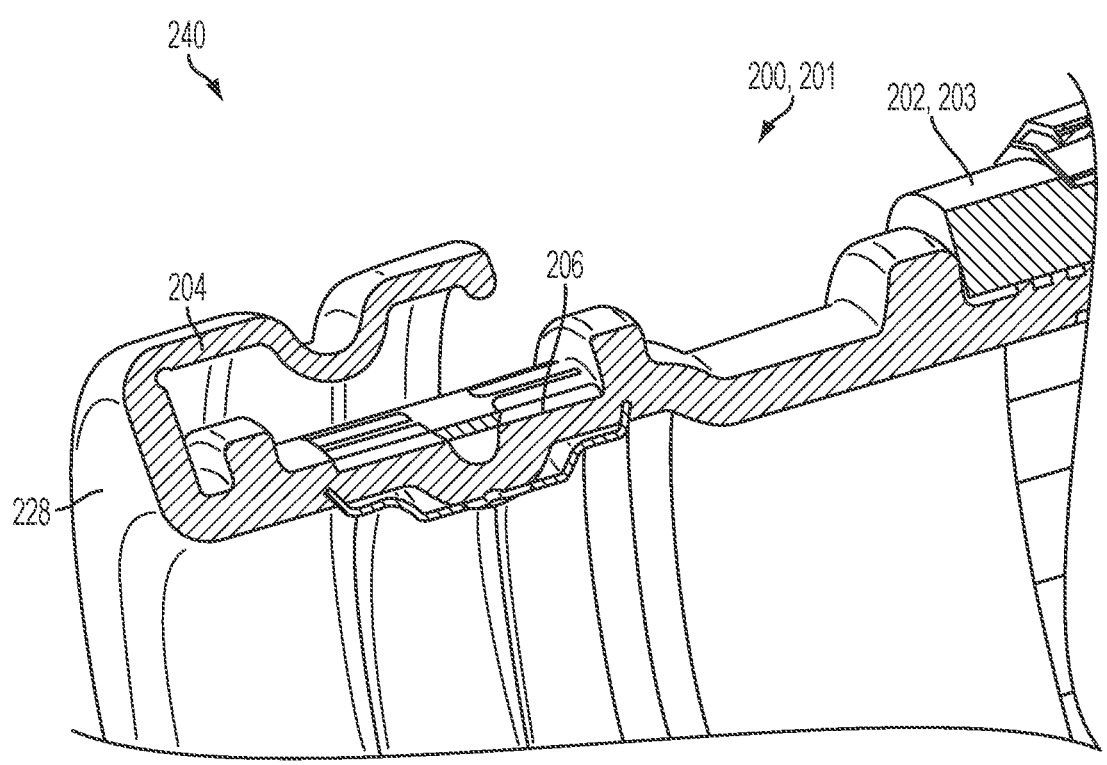
FIG. 6 is another perspective cross-sectional view of the hose illustrated in FIG. 4.
Figure 7A:
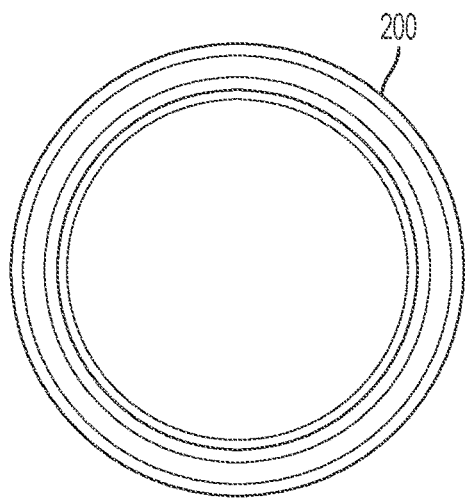
FIGS. 7A through 7C are respective front, side, and top side views of the example hose illustrated in FIG. 4.
Figure 7B:
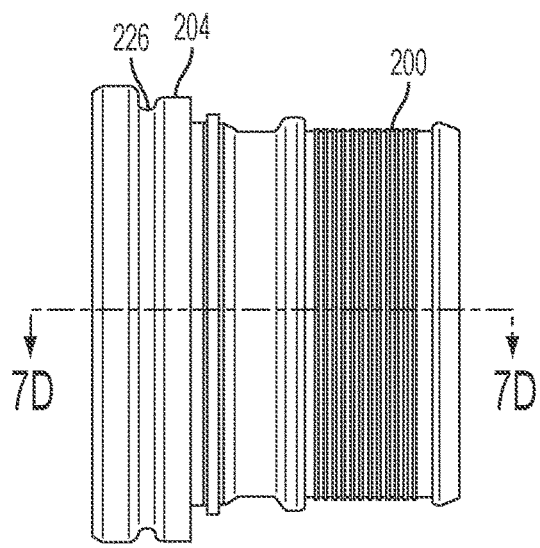
Figure 7C:
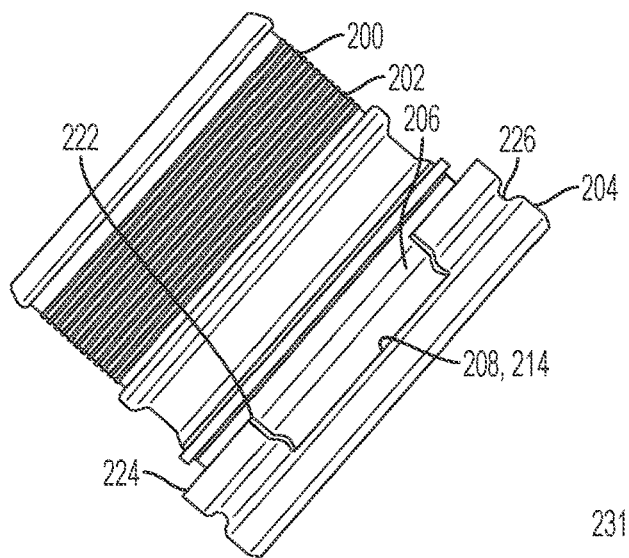
Figure 7D:
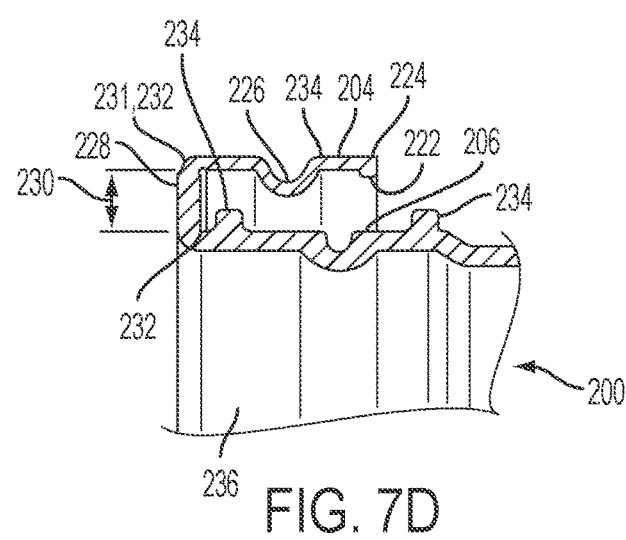
FIG. 7D is a partial sectional view taken at the line 7D-7D in FIG. 7B.

FIG. 4 is a perspective view of another example hose 200, or passage 201, in accordance with the present disclosure. FIG. 5 is a perspective cross-sectional view of the hose 200 illustrated in FIG. 4 taken through the clamp adjustment mechanism 212, and, FIG. 6 is a perspective cross-sectional view of the hose 200 taken through the clamp at a location spaced from the clamp adjustment mechanism 212. FIGS. 7A through 7C are respective front, side, and top side views of the example hose 200. FIG. 7D is a partial sectional view taken at the line 7D-7D in FIG. 7B.

FIG. 5 shows the relative thicknesses of the various sections with respect to one another. Further, it shows various features of the cross-sectional shape of the hose enabling it to fold, and then retain that folded position, including various semi-circular indents at the corners of the fold. See, for example, the additional description with respect to FIG. 6.

The example illustrates some example hoses wherein a stiffening ring 222 may be located at a terminal end 224 of the end segment 204. The end segment 204 may also include a circumferential retainer 226 disposed to restrict movement of the clamp 210 to within a predetermined amount.

The hose 200 may also include an annular segment 228 providing a radial offset 230 (FIG. 7D) of the end segment 204 from the hose body 202. The end segment 204 may be foldable at two or more spaced apart living hinges 232 which may be made integral with the hose 200.

In some embodiments the hose body 202 may include an inner diameter, or inner surface 236 sized to fit over a mating element included in an oil supply channel 112, or other line that may be configured to pass a fluid from one engine component to another, (see also FIG. 1) installed into an engine assembly.

Figure 8A:
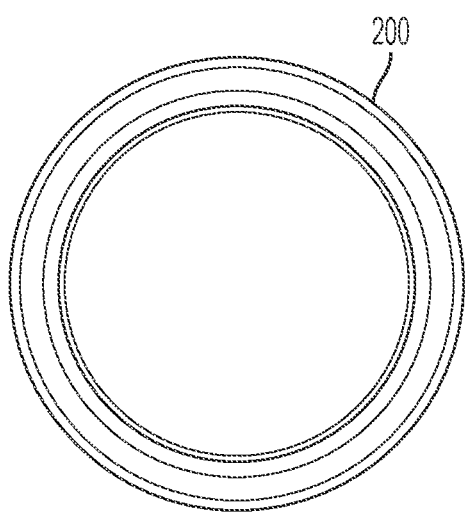
FIGS. 8A through 8C are respective front, right side, and left side views of another example hose, or passage in accordance with the present disclosure.
Figure 8B:
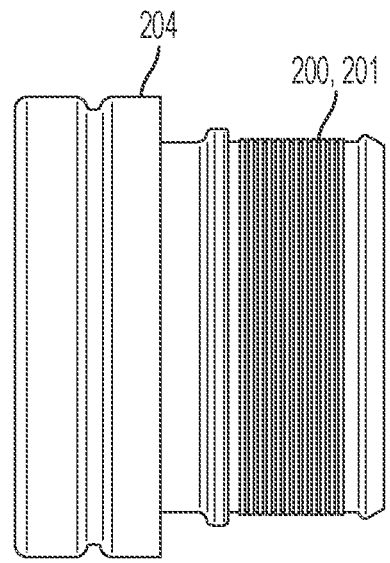
Figure 8C:
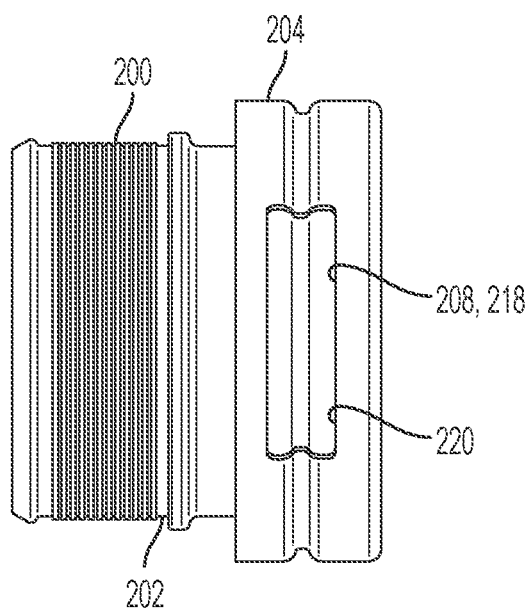
Figure 8D:
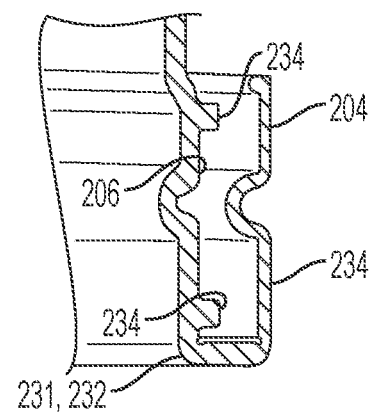
FIG. 8D is a partial sectional view of the hose, or passage illustrated in FIGS. 8A through 8C.

The hoses 200 shown in figures discussed so far illustrates examples wherein the opening 208 may be a notch 214 open at an end 216 of the hose 200. Other opening configuration may be used. FIGS. 8A through 8C are respective front, right side, and left side views of another example hose 200, or passage 201. FIG. 8D is a partial sectional view of the hose 200, or passage 201. In the illustrated example the opening 208 may be a window 218. In some cases the opening 208 may be a substantially rectangular window 218 that may have a substantially continuous perimeter edge 220 that may be formed integrally with the end segment 204.

Various embodiments may provide a hose 200. The hose 200 may include a hose body 202. One or more clamp retention features 234 (FIGS. 7D and 8D) may be integrally formed into the hose body 202 to retain a clamp 210 from movement relative to the hose body 202 beyond a predetermined amount of movement. In some cases the one or more clamp retention features 234 may be a foldable end segment 204 of the hose 200 that, when folded, at least partially covers the clamp 210. Other embodiments may have features made integral with the hose that may enable a portion of the hose to be repositioned over the clamp in ways other than folding. For example, in some cases the end may be rolled or twisted over the clamp. Some embodiments may be able to be folded and rolled, and/or folded at a first location and roll or twisted at another. The hose 200 may include an opening 208 in the foldable end 204 disposed to provide access to the clamp 210 when the foldable end segment 204 is folded over the clamp 210. The opening 208 may instead, or also, be located in a rolled and/or twisted portion of the hose.

Various embodiments may provide a system 240 that may include a flexible engine passage and clamp arrangement 242. The system 240 may also include a passage body 203, and a clamp 210 positioned over a portion of the passage body 203 and having a clamp adjustment mechanism 212 to adjust a tightness of the clamp 210. The system 240 may also include an end segment 204 of the passage body 203 foldable over the clamp 210. The end segment 204 may have an opening 208 that may provide access to the clamp adjustment mechanism 212 when the end segment 204 is in a folded state.

In some cases the flexible engine passage 201 may be an extruded body. The flexible engine passage 201 may also, or instead, be one or more of: a fuel line; a crankcase ventilation line; an oil supply channel; an intake line; an exhaust line; and a cooling line.

The flexible engine passage 201 may be foldable along one or more fold lines 231. The one or more fold lines 231 may be living hinges 232. The living hinges may be formed at or near the time of forming the flexible passage.

The system 240 may also include a retainer ring 226 formed into the passage body 201 disposed to contact the clamp 210 to prevent movement of the clamp 210 beyond a predetermined amount. In some cases the retainer ring 226 may be discontinuous. In other cases the retainer ring 226 may be continuous. The retainer ring 226 may be an annular concavity formed into the end segment 204.

The system 240 may also include a stiffening ring 222 at a terminal end 224 of the end segment 204. In some cases the stiffening ring 222 may be discontinuous. In other cases the stiffening ring 222 may be continuous.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hose comprising:
   a hose body;
   a clamp seat area encircling an exterior surface of the hose body;
   an end segment of the hose body folded over the clamp seat area; and
   an opening through the end segment aligned over the clamp seat area, the opening being sized and shaped to provide access to the clamp seat area.

2. The hose of claim 1, wherein the clamp seat area is disposed to receive a clamp in overlying disposition with the clamp seat area, the clamp having a clamp adjustment mechanism useable to adjust a tightness of the clamp accessible via the opening.

3. The hose of claim 1, wherein the opening is a notch open at an end of the hose.

4. The hose of claim 1, wherein the opening is a substantially rectangular window having a continuous perimeter edge formed integrally with the end segment.

5. The hose of claim 1, further comprising a stiffening ring at a terminal end of the end segment.

6. The hose of claim 1, wherein the end segment includes a circumferential retainer disposed to restrict movement of the clamp to within a predetermined amount.

7. The hose of claim 1, further comprising an annular segment providing a radial offset of the end segment from the hose body.

8. The hose of claim 1, wherein the end segment is foldable at two or more spaced apart living hinges integral with the hose.

9. The hose of claim 1, wherein the hose body includes an inner diameter sized to fit over a mating element included in an oil supply channel installed into an engine assembly.

10. A system comprising:
   a hose and a hose body;
   a clamp positioned on an exterior surface of the hose body; and
   one or more folding clamp retention features integrally formed into the hose body, the one or more folding clamp retention features folded over the clamp to retain the clamp from movement relative to the hose body beyond a predetermined amount of movement.

11. The hose of claim 10, wherein the one or more clamp retention features is a foldable end segment of the hose that, when folded, at least partially covers the clamp.

12. The hose of claim 11, further comprising an opening in the foldable end segment disposed to provide access to the clamp when the foldable end segment is folded over the clamp.

13. The hose of claim 12, wherein the opening is a notch formed at an end of the hose.

14. The hose of claim 12, wherein the opening is a window.

* * * * *